(12) United States Patent
He et al.

(10) Patent No.: US 7,505,481 B2
(45) Date of Patent: Mar. 17, 2009

(54) SYSTEM AND METHOD OF ACCESSING AND TRANSMITTING DIFFERENT DATA FRAMES IN A DIGITAL TRANSMISSION NETWORK

(75) Inventors: Zhiqun He, Shenzhen (CN); Yuxiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1057 days.

(21) Appl. No.: 10/765,204

(22) Filed: Jan. 28, 2004

(65) Prior Publication Data

US 2005/0008029 A1 Jan. 13, 2005

(30) Foreign Application Priority Data

Jan. 28, 2003 (CN) ................................. 03 1 03094

(51) Int. Cl.
H04J 3/22 (2006.01)
(52) U.S. Cl. .................. 370/466; 370/395.52; 370/392; 370/474
(58) Field of Classification Search ................. 370/465, 370/466, 401, 402, 473, 389, 404, 395.52, 370/395.51, 392, 474; 709/220, 238, 224–230, 709/249; 713/153, 154; 726/12–15
See application file for complete search history.

(56) References Cited

U.S. PATENT DOCUMENTS

| | | | |
|---|---|---|---|
| 5,541,853 A | 7/1996 | Croft | |
| 6,122,281 A | 9/2000 | Donovan et al. | |
| 2004/0076166 A1* | 4/2004 | Patenaude | 370/401 |
| 2004/0258080 A1* | 12/2004 | He et al. | 370/401 |
| 2005/0005029 A1* | 1/2005 | He et al. | 709/249 |

FOREIGN PATENT DOCUMENTS

CN 1299546 A 6/2001

OTHER PUBLICATIONS

"Multiple Services Ring Based on RPR"; Telecommunication Standardization Sector; Study Group 17; TD 2132 Rev. 3; Study Period 2001-2004; Geneva 2002; International Telecommunication Union.

(Continued)

*Primary Examiner*—Ian N Moore
(74) *Attorney, Agent, or Firm*—McDermott Will & Emery LLP

(57) ABSTRACT

A system accessing and transmitting different data frames in a digital transmission network for accessing and transmitting different data frames, including: at least a user-network interface (UNI), which is used to couple with the user's network; at least a network-network interface (NNI), which is used to couple with the digital transmission network to transfer data; a data converting device, which is coupled with the UNIs and the NNIs to convert data formats between the UNIs, data formats between the NNIs, or data formats between the NNIs and the UNIs; wherein the data converting device includes a virtual interface device, the virtual interface device includes: at least two device interfaces, a virtual interface processing unit, a rule database, a control interface unit and an inter-device interface, so as to improve access ability of the device.

14 Claims, 8 Drawing Sheets

OTHER PUBLICATIONS

European Search Report issued in European Patent Application No. EP 03 81 5515, mailed May 26. 2006.

International Search Report and Written Opinion of the International Searching Authority issued in International Application No. PCT/CN/03/00675.

European Search Report issued in European Patent Application No. EP 03 81 5515, mailed May 26, 2006.

International Search Report and Written Opinion of the International Searching Authority issued in International Application No. PCT/CN/03/00675.

* cited by examiner

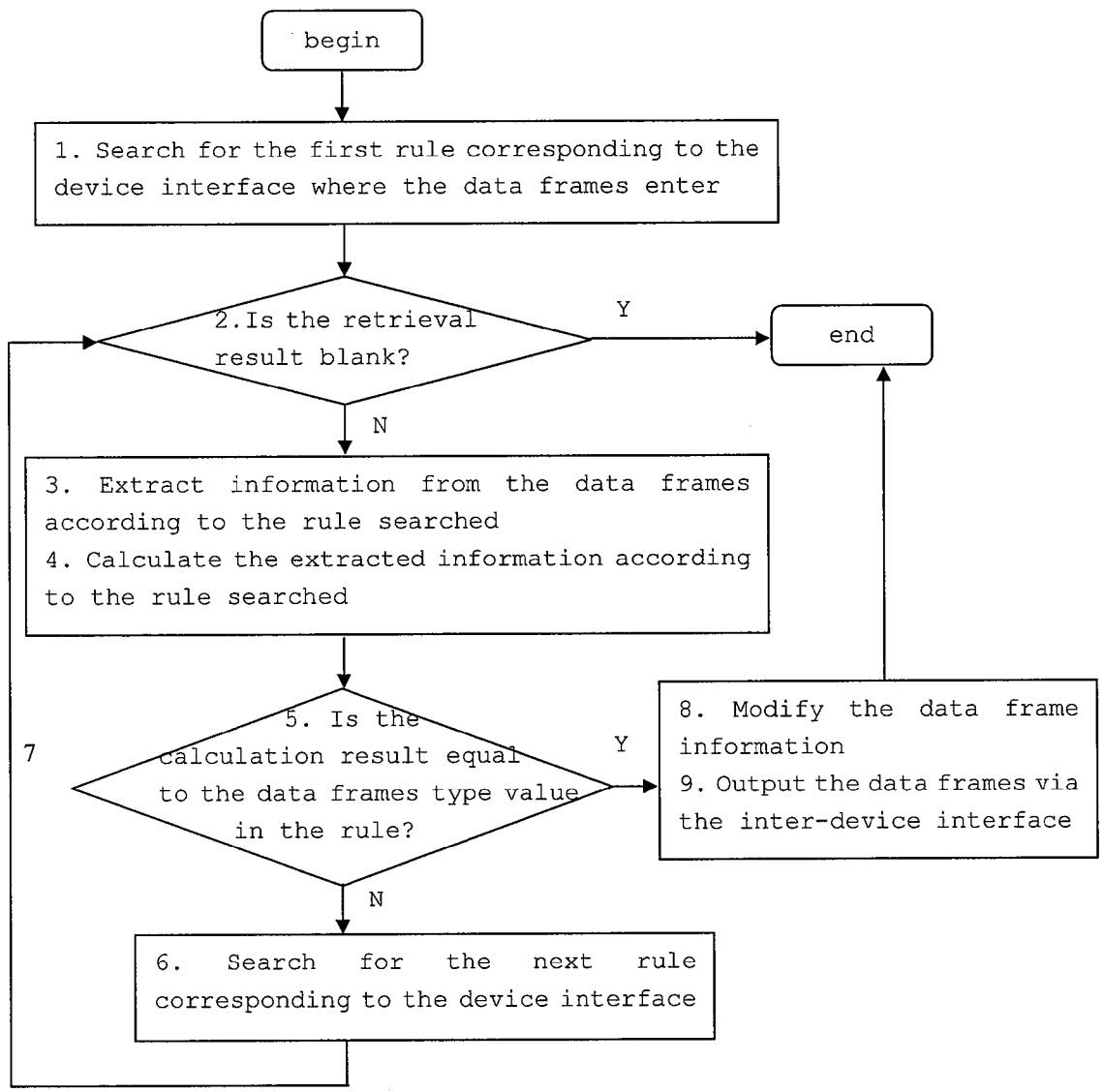
Fig.4A(F1)

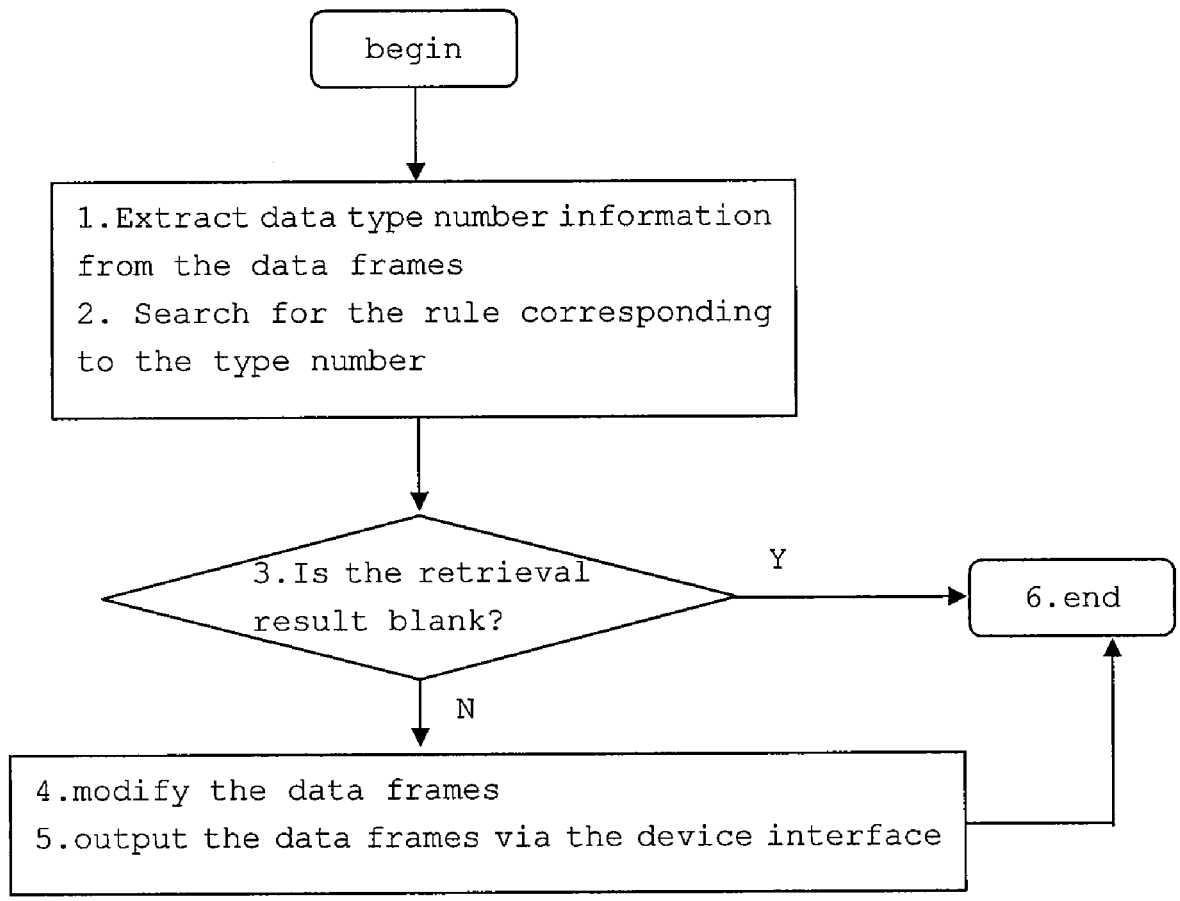
Fig.4A(F2)

SYSTEM AND METHOD OF ACCESSING AND TRANSMITTING DIFFERENT DATA FRAMES IN A DIGITAL TRANSMISSION NETWORK

FIELD OF THE INVENTION

The present invention relates to a system and method of accessing and transmitting data frames, in particular to a system and method of accessing and transmitting different data frames in a digital transmission network.

BACKGROUND OF THE INVENTION

Because Ethernet technology is featured with low price and high expansibility, etc., it has evolved from a mainstream LAN technology to a primary data service access technology and is widely used in Metropolitan Area Network (MAN) by more and more telecom operators. Providing Ethernet data services has becoming a trend for telecom operators. Ethernet data services can be classified into two types: Ethernet private line services and Virtual Local Area Network (VLAN) services.

For convenience, the phrases and abbreviations in the following description have the following meanings: MPLS—Multi-protocol Label Switching; GFP—General Frame Positioning; VLAN—virtual Local Area Network; VMAN—virtual Metropolitan Area Network; RPR—Resilient Packet Ring.

Currently, most of the telecom operators' data transmission networks are SDH/SONET networks. Therefore, it is a highlight for telecom operators and telecom equipment manufacturers to access and transfer Ethernet data frames effectively in a SDH/SONET network to meet the increasing demand for Ethernet data services. At present, several telecom equipment manufacturers have provided the devices to access and transfer Ethernet data frames in a SDH/SONET network, and those devices may be classified into 3 types according to the implementation approach of functionality:

(1) Data mapping/demapping scheme;
(2) Bridge scheme;
(3) RPR scheme.

FIG. 1 shows a block diagram of device according to the data mapping/demapping scheme in the first prior art. The device comprises one or more user-network interfaces (UNI) 20 (standard Ethernet interfaces), one or more network-network interfaces (NNI) 30 (synchronous digital transmission channels), one or more mapping/demapping devices 101, 102, . . . , each of which corresponds to a unique UNI and a unique NNI. Wherein, the data frames entering the device via UNI 20 and data frames output from the device comply with Ethernet data standard; data frames entering the device via NNI 30 and data frame output from the device comply with synchronous digital transmission network standard.

Wherein the mapping/demapping device 10 maps Ethernet data frames entering the device via UNI 20 to become synchronous digital data frames, and outputs the mapped data frames via NNI 30; the mapping/demapping device 10 demaps the synchronous digital data entering the device via NNI to Ethernet data frames, and outputs the data frames via the UNI. However, the functionality of the device is simple, thus it can only provide Ethernet private line services.

FIG. 2A shows a block diagram of the device utilizing bridge scheme in the second prior art. The device comprises one or more UNIs 20 (standard Ethernet interfaces), each of which corresponds to a unique bridge port. The device further comprises one or more NNIs 30 (synchronous digital transmission channels). The device further comprises a bridge device 400 (described in detail in IEEE802.1D and IEEE802.1Q), wherein the bridge device 400 comprises a plurality of bridge ports, each of which corresponds to a unique UNI or a unique mapping/demapping device. Each mapping/demapping device corresponds to a unique bridge port and a unique NNI. Wherein, the data frames entering the device via UNI 20 and the data frames output from the device comply with Ethernet data standard; data frames entering the device from NNI 30 and data frame output from the device comply with the standard of synchronous digital transmission network.

Data frames entering the device via UNI 20 enter the bridge device 400 via the bridge port corresponding to the UNI; the bridge device 400 calculates the bridge output port according to the address information in the data frames and sends the data frames to the corresponding mapping/demapping device 102 (the mapping/demapping device maps the data frames and then outputs them to the NNI) via the output port, and vice versa.

In the bridge scheme, usually the operator is allowed to map partial or all UNIs to mapping/demapping devices in a one to one way through configuration. In this case, the device employs both of above technical schemes, so it is called an enhanced bridge scheme. The functional model of an enhanced bridge device is shown in FIG. 2B.

The disadvantage of the second prior art is:

(1) It is unable to provide integral VLAN service. If a plurality of users are attached to the device via UNIs and there are conflicts among address spaces of Ethernet data frames of those users, the device is unable to isolate the conflicts effectively, thus it is unable to provide services correctly to those users.

(2) A common bridge (non-enhanced bridge) is unable to provide Ethernet private line service.

(3) A UNI can only support one service type (Ethernet private line service or VLAN service), which limits the access capability of the device. In some cases, though the processing capacity of the device is still sufficient enough, new devices have to be added to improve access capacity because the UNIs have been used up.

(4) A NNI can only support one service type (Ethernet private line service or VLAN service), which leads to low convergence capability of the device. In some cases, in a star topology network, though the processing capacity of the device is still sufficient enough, new devices have to be added to improve convergence capacity because the NNIs have been used up. For operators, it means not only new investment but also bandwidth waste.

FIG. 3 shows a block diagram of the device utilizing RPR scheme in the third prior art. The device comprises one or more UNIs (standard Ethernet UNIs), two NNIs (synchronous digital transmission channels), and a RPR device 600 (described in IEEE802.17), two mapping/demapping devices, and a data processing device 500 which may be a data converging/deconverging device or a bridge device).

Wherein the data frames entering the device via the UNI 20 are processed as follows:

Step 1: the data processing device 500 processes the data frames (the data frames are converged if the data processing device is a data converging/deconverging device; the data frames are switched if the data processing device is a bridge device);

Step 2: the data processing device 500 transfers the processed data frames to the RPR device 600;

Step 3: the RPR device 600 sends the data frames to the corresponding mapping/demapping device according to the address information in the data frames;

Step 4: the mapping/demapping device maps performs mapping operation for the data frames and sends them to outside of the device via the corresponding NNI.

The data frames entering the device via the NNI are processed as follows:

Step 1: the mapping/demapping device performs demapping operation for the data frames and transfers the demapped data frames to the RPR device 600;

Step 2: the RPR device 600 processes the data frames and then sends them to the data processing device;

Step 3: the data processing device 500 processes the data frames (the data frames are deconverged if the data processing device is a data converging/deconverging device; the data frames are switched if the data processing device is a bridge device);

Step 4: the data processing device 500 finds corresponding UNI according to the address information in the data frames and then outputs the data frames via the UNI.

The disadvantages of said scheme are:

(1) It is unable to provide Ethernet private line service and VLAN service at the same time. If the data processing device is a bridge device, it doesn't support Ethernet private line service; if the data processing device is a data converging/deconverging device, it doesn't support VLAN service.

(2) It can only be used in a ring topology network.

SUMMARY OF THE INVENTION

An object of the present invention is to provide a virtual bridge device in SDH/SONET network and the method of accessing and transmitting data frames in a SDH/SONET network thereof, in order to improve the converging ability. According to the present invention, one UNI or NNI can be expanded to a plurality of virtual interfaces, and every virtual interface corresponds to different user and different service to overcome the disadvantages of the prior art.

According to one aspect of the present invention, it is provided a system accessing and transmitting different data frames in a digital transmission network for accessing and transmitting different data frames, said system comprises:

At least a UNI, which is used to couple with the user's network; and/or at least a NNI, which is used to couple with said digital transmission network to transfer data; and a data converting device, which is coupled with said UNIs and said NNIs to convert data formats between said UNIs, data formats between said NNIs, or data formats between said NNIs and said UNIs;

Said data converting device comprises a virtual interface device, said virtual interface device comprises: at least two device interfaces which comprises UNIs or NNIs, for inputting or outputting data frames; a virtual interface processing unit, which couples with said device interfaces to process said data frames and exchange said data frames between said virtual interface processing unit and corresponding device interfaces; rule database, which couples with said and stores rules corresponding to different data frames, said virtual interface processing unit determines the processing flow according to the classification of data frames under said rules; a control interface unit, which couples with said rule database and said virtual interface processing unit to control them; an inter-device interface, which couples with said virtual interface processing unit to couple with external devices to exchange data.

Optionally, the corresponding relationship between said device interfaces and said rules is 1:N (N is a natural number greater than 1), and each device interface is configured as a device interface meeting the requirement of the data interface corresponding to any of the rules.

Preferably, said control interface unit provides an external control interface, through which to inspect the operation of the virtual processing unit, and add, delete, modify and search operations are performed to rules in said rule databases.

Optionally, the rule comprises device interface number, data frame type number, data frame address offset, data frame type value, and data frame comparison mask, which provides relevant processing and control parameters when said virtual interface processing unit processes said data frames.

Preferably, said device interfaces connect with said UNIs or said NNIs, the corresponding relation between said device interfaces and said UNIs or said NNIs is 1:1, and said inter-device interface connects with said data processing and dispatching device.

The present invention also provides a method of accessing and transmitting different data frames in a digital transmission network through said system, said system comprises a data converting device comprising a virtual interface device, wherein said method comprises the following steps:

Searching for a rule corresponding to said device interface;

Determining whether said rule is found, if not, ending the process;

If yes, obtaining the type information of the data frames;

determining whether said type information complies with the second rule in the rules;

If not, searching for the next rule corresponding to the device interface, and determining again whether said rule is found;

If yes, modifying said data frames information, outputting the data frames via the inter-device interface, and then ending the process.

Optionally, when the data frame enters the device via the inter-device interface, said virtual interface device also performs the following steps:

Extracting the type information of the data frames, and searching for corresponding rule in the rule database according to said type information;

If the rule is not found, discarding said data frames and ending the process;

If the rule is found, modifying said data frames information, and sending the data frames to corresponding device interface according to the rule.

Preferably, search in the rule database according to the number of device interface receiving the data frames.

Optionally, said step of the rule being not found comprises the step of outputting a report and discarding said data frames.

Preferably, the step of obtaining the type information of the data frames comprises: read the information at the address offset according to the data frame address offset, and perform "AND" operation between said read information and data frame comparison mask in the rule.

Optionally, the step of determining whether the type information complies with the second rule in the rules comprises the following step: comparing the type information with the data frame type value in the rules.

Preferably, the step of modifying the data frames information comprises the following step: inserting the data type number information at the head position of the data frames.

Optionally, the step of extracting the type information of the data frames comprises the following step: extracting the data type number information at the head position of the data frames.

Preferably, the step of searching corresponding rule in the rule database comprises the following step: searching in the rule database with the index of the data frame type number.

Optionally, the step of modifying the data frame information and sending the data frames to corresponding device interfaces according to corresponding rules comprises the following steps: deleting the data type number information at the head position; and sending the data frames to corresponding device interfaces according to the device interface number in the rule.

The system and method according to the present invention have the following advantages:

(1) With the virtual interface device and the method of the present invention, data from the device interface is processed after classified, different data type corresponds to different processing flow;

Existing technical schemes and devices have to be implemented on a presumption: data frames from a device interface belong to the same type, and different types of data frames enter the device via different device interfaces. Therefore, in the prior technical scheme and system, data frames entering the device via the same device interface are processed through the same processing flow, thus the mapping relationship between processing flows and device interfaces is 1:n. As a result, if there are many data types sometimes, though the processing capacity of the device is still sufficient enough, some services can't be supported due to lack of free device interfaces.

Whereas with the system and method of the present invention, data frames from a device interface may contain various types, and processing flows for different types of data frames are different; the mapping relationship between processing flows and device interfaces is m:n.

(2) According to the system and method of the present invention, both VLAN service and Ethernet data private service can be achieved at a device interface (a UNI or a NNI). And data frames of many users can be accessed and converged at a device interface, thus the accessing and converging abilities of the device are improved greatly.

(3) According to the system and method of the present invention, operators can adjust the processing flow in the device flexibly according to the network topology, users' requirements and bandwidth resource etc, thus the processing ability and efficiency of bandwidth can be improved.

BRIEF DESCRIPTION OF THE DRAWINGS

FIG. 4 (F) shows the data processing flowchart of a preferred embodiment of the system accessing and transmitting Ethernet data frames in a SDH/SONET network;

FIG. 4A (F1) shows the flowchart of the virtual interface device processing the data entering from the interface of processing device in a preferred embodiment of the system accessing and transmitting Ethernet data frames in a SDH/SONET network according to the present invention;

FIG. 4A (F2) shows the flowchart of the virtual interface device processing the data entering from the inter-device interface in a preferred embodiment of the system accessing and transmitting Ethernet data frames in a SDH/SONET network according to the present invention;

FIG. 5 (F) shows the flowchart of the virtual private device processing the data entering from the inter-device interface in a preferred embodiment of the system accessing and transmitting Ethernet data frames in a SDH/SONET network according to the present invention;

FIG. 6 (F1) shows the flowchart of the virtual bridge device processing the data entering from the inter-device interface in a preferred embodiment of the system accessing and transmitting Ethernet data frames in a SDH/SONET network according to the present invention;

FIG. 7 (F) shows the flowchart of the data processing and dispatching device processing the entered data in a preferred embodiment of the system accessing and transmitting Ethernet data frames in a SDH/SONET network according to the present invention;

DETAILED DESCRIPTION OF THE EMBODIMENTS

To make the system and method of the present invention be better understood, the basic function of the device is describe first. Usually, any device has the following 3 functions:

(1) Input function, i.e., receive external information;

(2) Processing function, i.e., process said external information;

(3) Output function, i.e., output the processed information.

For a device accessing and transmitting Ethernet data frames in a SDH/SONET network:

(1) Input function: receive external information via the UNIs and the NNIs;

(2) Output function: output the processed information via the UNI and the NNI;

(3) Processing function: for a device accessing and transmitting Ethernet data frames in a SDH/SONET network, different processing ability as well as service ability and service efficiency depend on different technical schemes.

In addition, the phrase "standard Ethernet interface" used in the present invention means the following:

IEEE802.3 defines the LAN interface in detail; Such an interface is regarded as a standard Ethernet interface in the present invention.

The present invention will be described hereunder with reference to the drawings. For concision, components and units described in prior art will not be described in detail hereunder. And components and units described above will not be described in detail hereunder.

Figure 4:
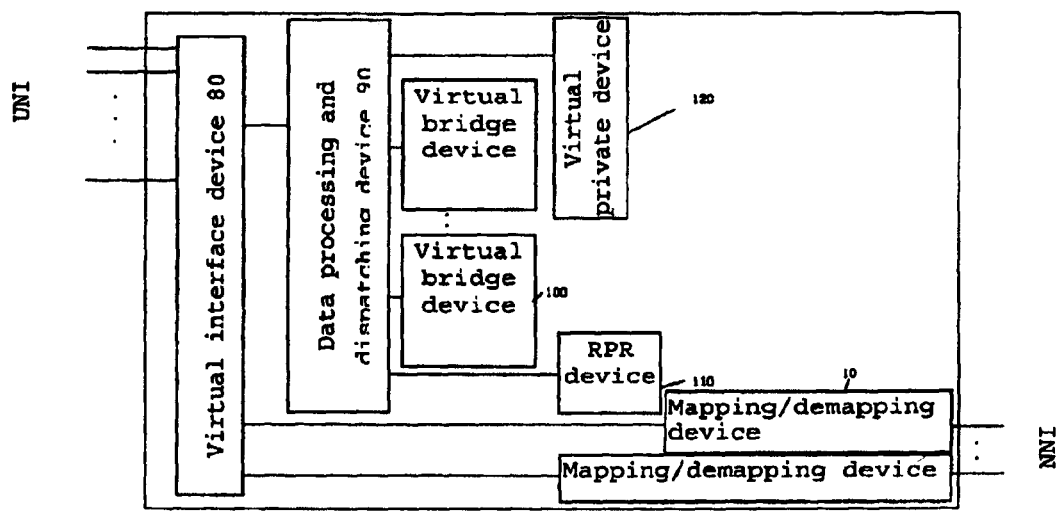

FIG. 4 shows a system that accesses and transmits different data frames in a digital transmission network. The system comprises a plurality of UNIs designed to couple with the users' networks, a plurality of NNIs designed to couple with said digital transmission network to transmit data, a plurality of mapping/demapping devices 10, a virtual interface device 80 coupled with said UNIs and also coupled with said NNIs via said mapping/demapping devices 10, a data processing and dispatching device 90 coupled with said virtual interface device 80, a plurality of virtual private devices 120 and a virtual bridge device 100 and a RPR device 110 coupled with said data processing and dispatching device. Wherein said mapping/demapping devices 10, said virtual interface device 80, and said data processing and dispatching device 90 constitute the data converting device of the present invention. Although a plurality of virtual private device 120, a virtual bridge device 100 and a RPR device 110 are described in the present invention, it should be noted that a combination of any one or two of them can implement the present invention. The input to said system comprises: (1) data frames entering the system via the UNIs; (2) data frames entering the system via the NNIs. The data frames output from said system comprises: (1) data frames from the UNIs; (2) data frames from the NNIs.

FIG. 4 (F) shows the processing steps for data frames entering the system via the UNIs.

First, in step 1, the virtual interface device performs matching action to the data frames according to classifying rules;

In step 2, the virtual interface device modifies the data frames according to classifying rules, i.e., inserts data type number in the data frames;

In step 3, the virtual interface device transfers the modified data frames to the data processing and dispatching device;

In step 4, the data processing and dispatching device finds corresponding processing device according to the data type number in the data frames;

In step 5, the data processing and dispatching device transfers the data frames to the corresponding processing device; if it is the virtual private device to process the data frames, the data frames are transferred to the virtual private device; if it is the virtual interface device to process the data frames, goes to step 8;

In step 6, said corresponding processing device processes the data frames, and modifies the data type number at the end of the processing, and then transfers the modified data frames to the data processing and dispatching device;

In step 7, goes to step 4;

In step 8, the virtual interface device finds corresponding device interface according to the data type number in the data frames;

In step 9, the virtual interface device modifies the data frames, i.e., deletes the data type number from the data frames;

In step 10, the virtual interface device outputs the modified data frames via the device interface (if the device interface is a NNI, mapping operation should be performed through the mapping/demapping device before output).

The processing steps for data frames entering the device via the NNI are as follows:

In step 1, the mapping/demapping device performs demapping operation to the data frames;

In step 2, the remaining processing steps are identical to those for data frames entering the system via the UNIs.

When implementing functions of the system, the device manufacturers may partially or completely employ above method. For devices with simple functions, the processing is relatively simple. The device manufacturers may even treat the processing as firmware through fixing connections among the devices to omit the data processing and dispatching device.

Figure 4A:
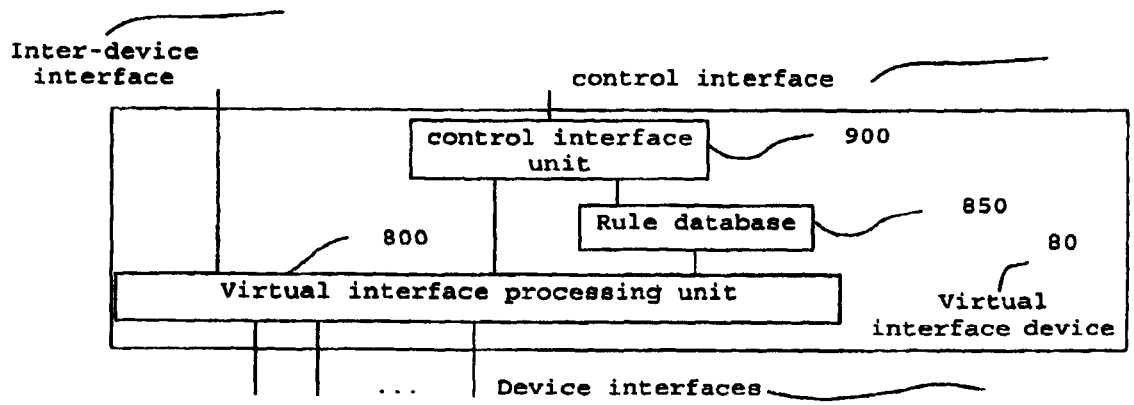

FIG. 4A shows the schematic block diagram of virtual interface device in a preferred embodiment of the system accessing and transmitting Ethernet data frames in a SDH/SONET network according to the present invention. A virtual interface device 80 is used to enhance access ability. Via the virtual interface device 80, a device interface (UNI 20 or NNI 30) may be expanded to a plurality of virtual interfaces, each of which supports specific users and services. For data frames entering the system via the device interfaces (UNI 20 and NNI 30), the virtual interface processing unit 800 of the virtual interface device will classify them according to different services required by the users and choose corresponding processing for them. Different processing corresponds to different rules in the rule database 850. The control interface unit controls the virtual interface processing unit 800 to classify the data frames according to the orders from the control interface and searches for corresponding rules stored in the rule database 850 to process the data. Data frames output from the device are transferred to corresponding device interface after classified in the virtual interface device. Because the virtual interface device stores N rules, the mapping relationship between the device interface and those rules is 1:N. The rules in the virtual interface device may be set up or deleted dynamically. Therefore, it is easy to modify the rules to enhance the adaptability of the system according to the users' requirements and the updating of the system. The device also comprises a software loader (not shown) to load different software.

As the processing center, the virtual interface processing unit 800 is responsible for processing data frames; the processing steps and processing logic in the virtual interface processing unit are firmware and can't be modified during operation of the system. The rule database is the control center and is responsible for providing relevant processing and control parameters when the virtual interface processing unit processes the data frames. Different parameters lead to corresponding processing behaviors. During operation of the system, the rules in the rule database may be updated. The control interface unit provides an external control interface. Via the control interface, the control system of the device may monitor the virtual interface processing unit and performs adding, deleting, editing, and querying operations to rules in the rule database. The rule database may store a plurality of rules, each of which contains five parts: device interface number, data frame type number, data frame address offset, data frame type value, and data frame comparison mask.

Wherein the virtual interface device is connected to the UNIs or the NNIs via the device interfaces. The mapping relationship between the UNIs (or NNIs) and the device interfaces is 1:1. The virtual interface device is connected to the data processing and dispatching device via the inter-device interface. The virtual interface device is connected to the control system of the device via the control interface.

FIG. 4A (F1) shows the steps of the virtual interface processing unit processing data frames entering the virtual interface device via the device interface:

Step 1: searching for the first rule in the rule database corresponding to the device interface with the index of the device interface number;

Step 2: determining the retrieval result; if it is blank, discarding said data frames and going to step 10;

Step 3: reading information at address offset of the data frame according to the data frame address offset in the rule;

Step 4: performing "AND" operation between said read information and data frame comparison mask in the rule;

Step 5: comparing the result of step 4 with the data frame type value in the rule; if they are equal, going to step 8;

Step 6: searching for the next rule corresponding to said device interface in the rule database;

Step 7: going to step 2;

Step 8: modifying the data frame, i.e., inserting data type number information in the rule in the head position of the data frames;

Step 9: transferring the data frames to the data frame processing and dispatching device via the inter-device interface;

Step 10: ending.

FIG. 4A (F2) shows the steps of the virtual interface processing unit processing data frames entering the virtual interface device via the inter-device interface. The processing steps are as follows:

Step 1: extracting the data frame type information from head position of the data frames;

Step 2: searching in the rule database with the index of data frame type number;

Step 3: determining the retrieval result; if it is blank, discarding said data frames and going to step 6;

Step 4: modifying the data frames, i.e., deleting the data frame type number information from head position of the data frames;

Step 5: sending the data frames to corresponding device interface according to the device interface number in the rule;

Step 6: ending.

Figure 5:
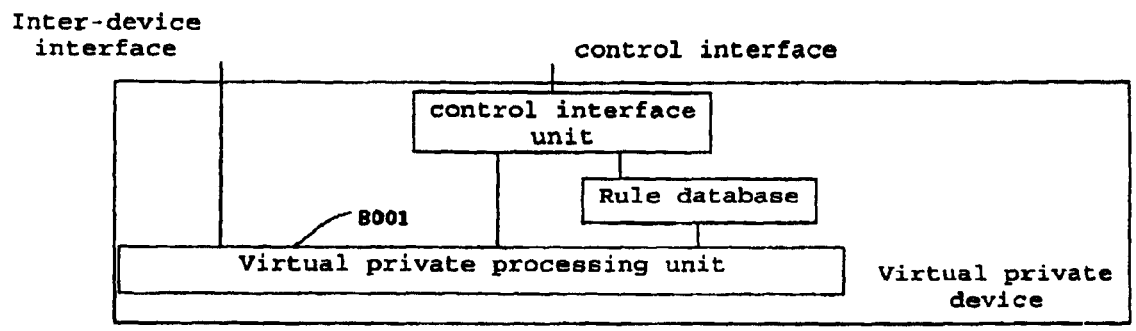
Figure 6:
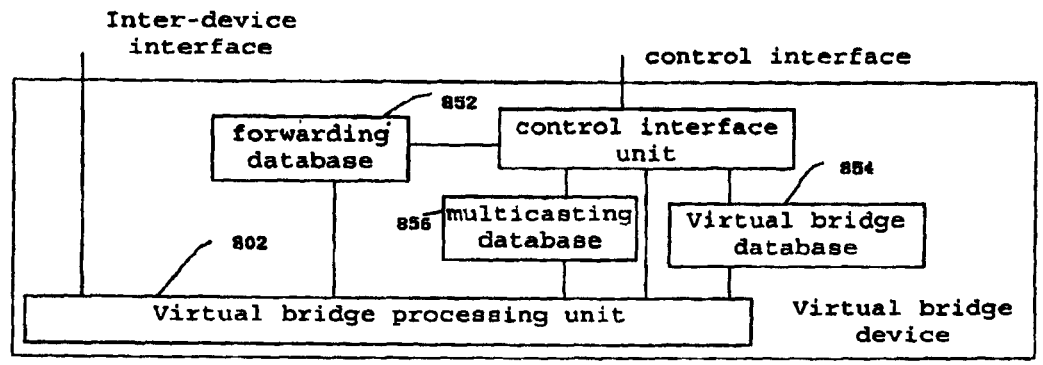

FIG. 5 shows the schematic block diagram of virtual private device in a preferred embodiment of the system accessing and transmitting Ethernet data frames in a SDH/SONET network according to the present invention.

In the virtual private device, a virtual private processing unit 8001 is coupled with the inter-device interface to process the data from the inter-device interface. The virtual private processing unit 8001 is also coupled to the rule database and the control interface unit. The control interface unit exchanges data with outside world via the control interface.

The present invention enhances converging ability of the system through utilizing the virtual private device. The virtual private device stores converging rules, deconverging rules, and relay rules (the relay rules are optional and unnecessary in some simple virtual private devices). The mapping relationship between data types and the rules is 1:1. The rules in the virtual private device can be set up and deleted dynamically. Data frames of different users can be isolated, transmitted and shared by adding a label before sending, changing the label during transmission and removing the label at destination address. A virtual private device comprises a virtual private processing unit and a rule database in it.

The virtual private processing unit has two major functions:

(a) Detecting control messages and transferring the control messages to the control system of the device via the control interface unit.

(b) Performing convergence, deconvergence, of relay operation for data frames except for the control messages.

The virtual private processing unit is the processing center of the device; the following items are stored in the virtual private processing unit as firmware:

(a) Format of control messages;

(b) Processing steps and logic for data frames;

(c) Format of rules in the rule database;

As the control center, the rule database controls the processing action of the virtual private processing unit. The rules in the rule database may be updated dynamically. The rule database may store a plurality of rules, each of which comprises the following information: input data frame type number, rule type (convergence/deconvergence/relay), label number, and output data frame type number.

Wherein said virtual private device is connected to the said data processing and dispatching device via the inter-device interface; said virtual private device is connected to the control system of the device via the control interface.

There are different technical schemes to implement the virtual private device. However, the data frames processing steps and logic in the virtual private processing unit is identical under these schemes. The main differences between these schemes are:

(a) Format of rules in the rule database, for example, length and position of label in the rule are different;

(b) Format of control messages processed in the virtual private processing unit.

In view of expandability and compatibility, it is recommended to implement the virtual private device with MPLS, GFP, VMAN, or Nested VLAN technique. The device manufacturers may also employ self-defined label formats (or self-defined data frame packets) to implement said virtual private device. The system may support a plurality of virtual private devices implemented with different technical schemes.

FIG. 5 (F) shows the flowchart of the virtual private processing; for data frames entering the device via the inter-device interface, the processing steps of the virtual private processing unit are as follows:

Step 1: determining whether the data frames are control messages; if yes, going to step 3;

Step 2: transferring the data frames to an external control system via the control interface unit, and then going to step 12;

Step 3: extracting the input data type number information from the head position of the data frames;

Step 4: searching in the rule database with the index of the input data type number information;

Step 5: determining the retrieval result; if it is blank, discarding said data frames and going to step 12;

Step 6: determining the rule type; if it is a convergence rule, going to step 7; if it is a deconvergence rule, going to step 8; if it is a relay rule, going to step 9;

Step 7: modifying the data frames, i.e., inserting a label number defined in the rule at a special position in the data frames, and then going to step 10;

Step 8: modifying the data frame, i.e., removing the label number at the special position in the data frames, and then going to step 10;

Step 9: modifying the data frames, i.e., replacing the label number at the special position in the data frames with a label number defined in the rule;

Step 10: modifying the data frames, i.e., replacing the data type number at the head position of the data frames with the output data type number defined in the rule;

Step 11: transferring the data frames to the data frame processing and dispatching device via the inter-device interface;

Step 12: ending.

Figure 7:
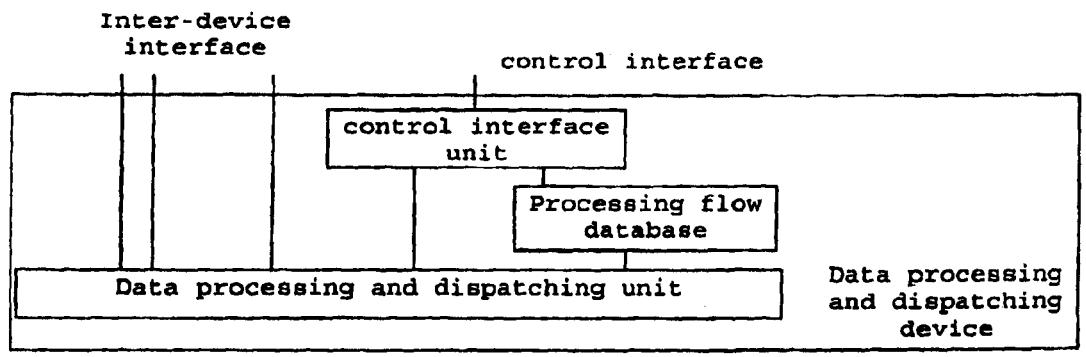

FIG. 7 shows the schematic block diagram of data processing and dispatching device in a preferred embodiment of the system accessing and transmitting Ethernet data frames in a SDH/SONET network according to the present invention. The data processing device is coupled with a plurality of inter-device interfaces to process the data from the inter-device interfaces. The data processing device is also coupled with the processing steps database and the control interface unit. The control interface unit exchanges data with outside world via the control interface.

The present invention utilizes the data processing and dispatching device to implement individualized services to improve equipment serviceability. The data processing device stores a plurality of processing flows. The mapping relationship between the processing flows and the data frame types is 1:1. The data processing and dispatching device finds corresponding processing flow according to data frame type, and informs other devices to process the data frames according to the processing flow. The processing flows in the data frame processing device may be set up, edited, or deleted dynamically. During operation of the system, the operator may quickly provide individualized services to maximize the efficacy of the system through adding, editing, and deleting the processing flows in the data processing device.

The data processing and dispatching device is the processing center of the system, and the processing flows are embedded in it as firmware. There are a plurality of inter-device interfaces in the data processing and dispatching device, each of which maps to a unique external device. The mapping relationship between the inter-device interfaces and the external devices are fixed.

The processing flow database is the control center of the system, and the items in the database may be updated dynamically. Each processing flow in the processing flow database contains the following information:
 (a) Data frame type number;
 (b) Inter-device interface number The data processing and dispatching device is connected to other devices via the inter-device interfaces, each of the inter-device interfaces maps to a virtual bridge device, a virtual private device, a RPR device, or a virtual interface device. The data processing and dispatching device is connected to the control system of the device via the control interface.

Figure 1:
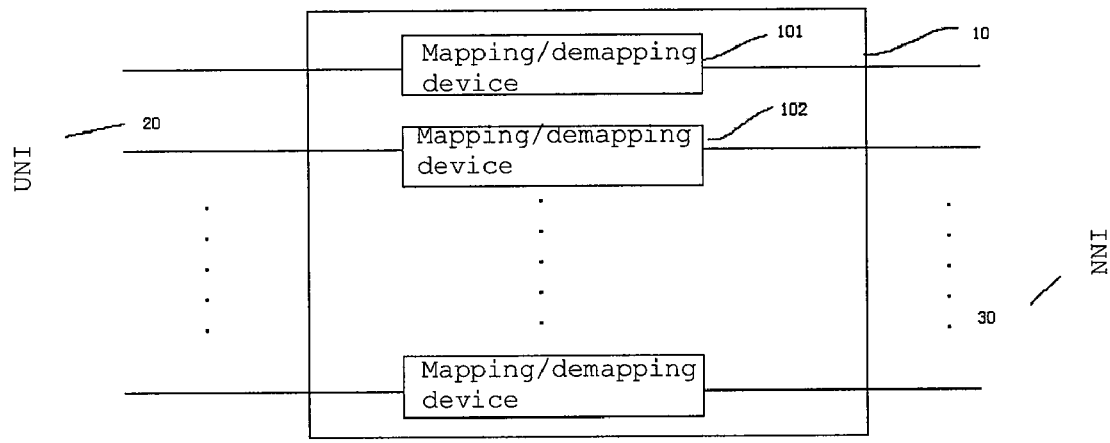
FIG. 1 shows the block diagram of the data mapping/demapping scheme according to the first prior art.
Figure 2A:
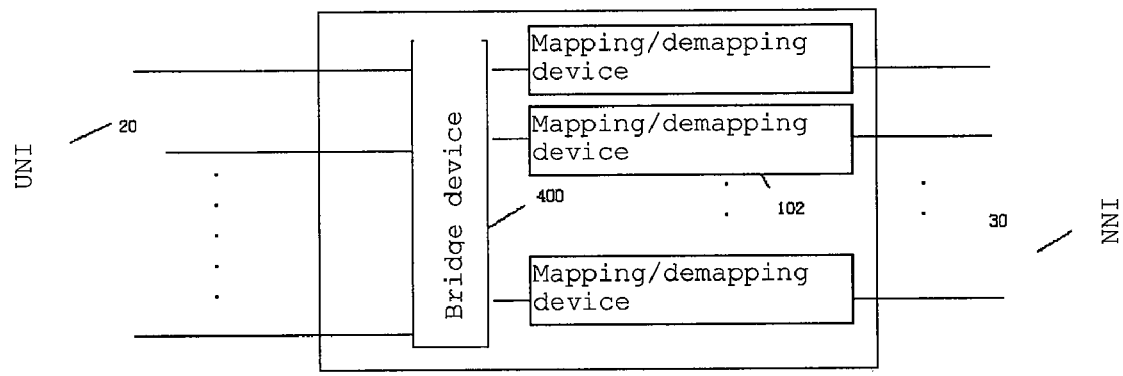
FIG. 2A shows the block diagram of the bridge scheme according to the second prior art.
Figure 2B:
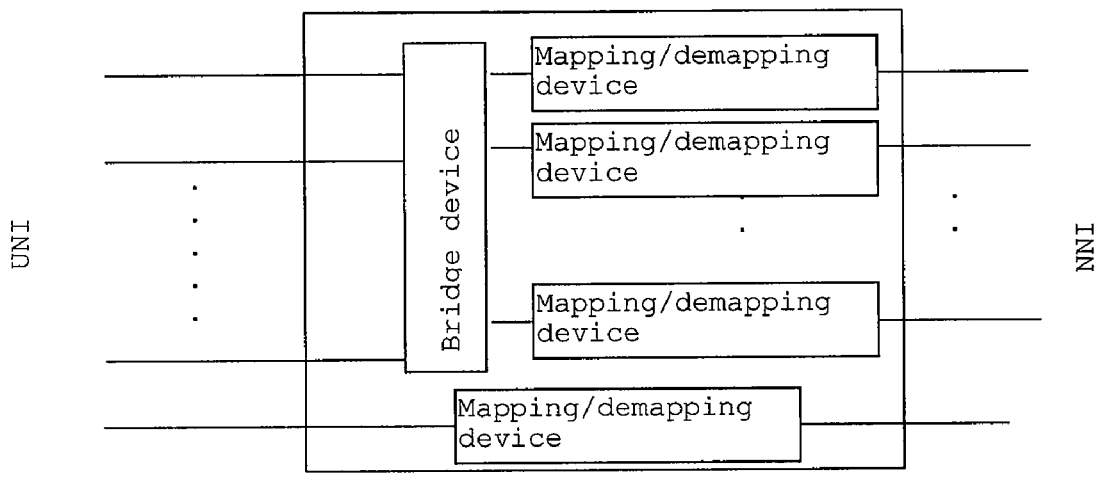
FIG. 2B shows the block diagram of the enhanced bridge scheme according to the second prior art.
Figure 3:
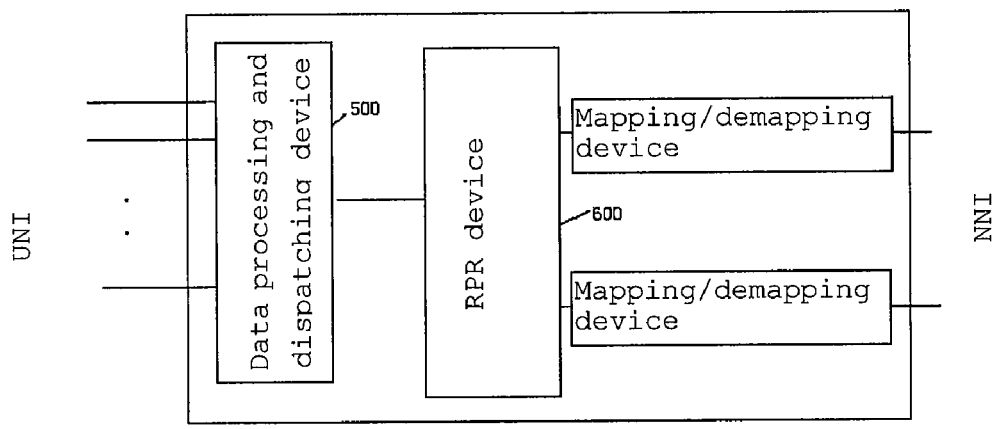
FIG. 3 shows the block diagram of RPR scheme according to the third prior art.
Figure 4F:
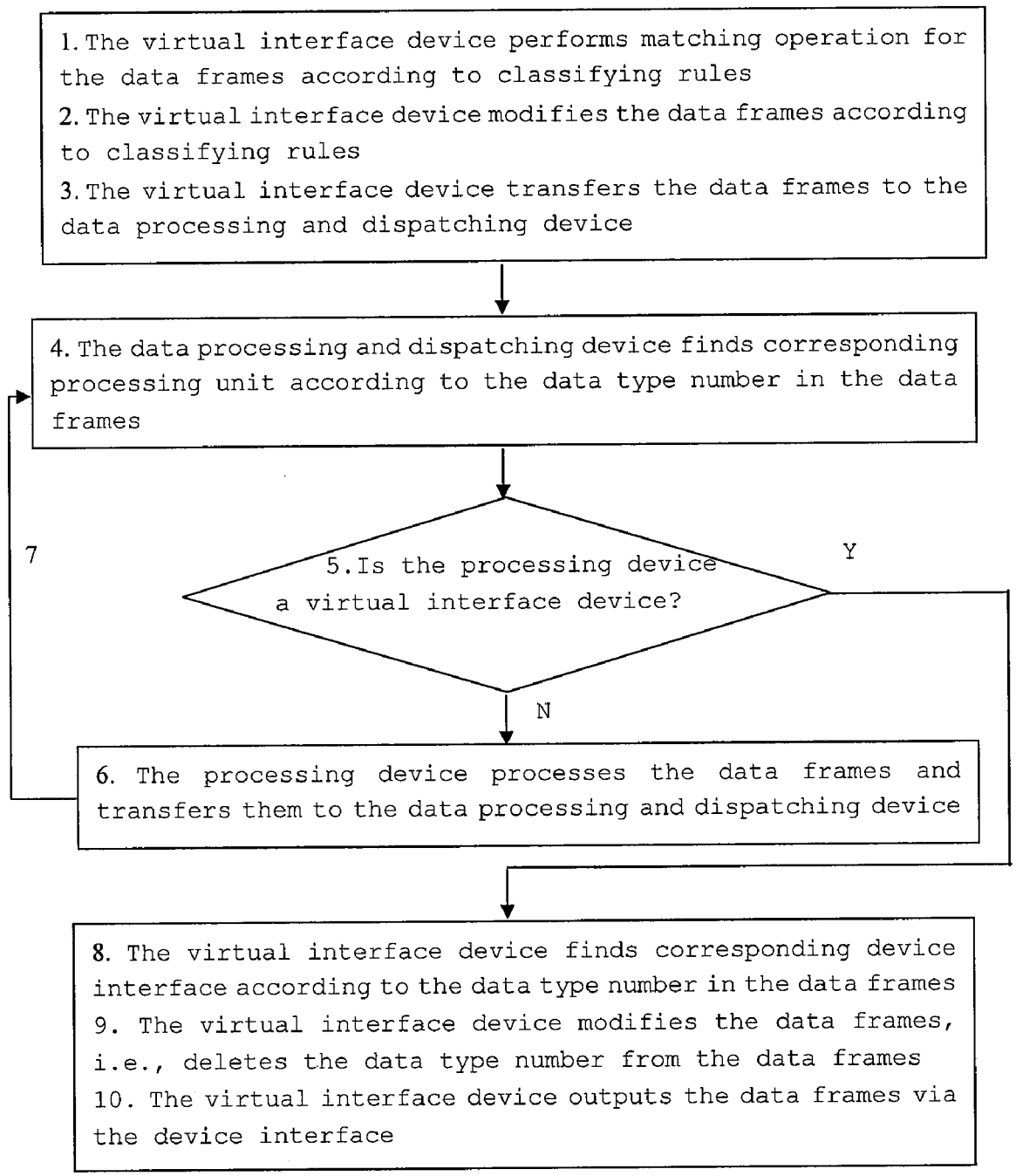
FIG. 4 shows the schematic diagram of a preferred embodiment of the system accessing and transmitting Ethernet data frames in a SDH/SONET network according to the present invention.
FIG. 4A shows the schematic block diagram of virtual interface device in a preferred embodiment of the system accessing and transmitting Ethernet data frames in a SDH/SONET network according to the present invention.
Figure 5F:
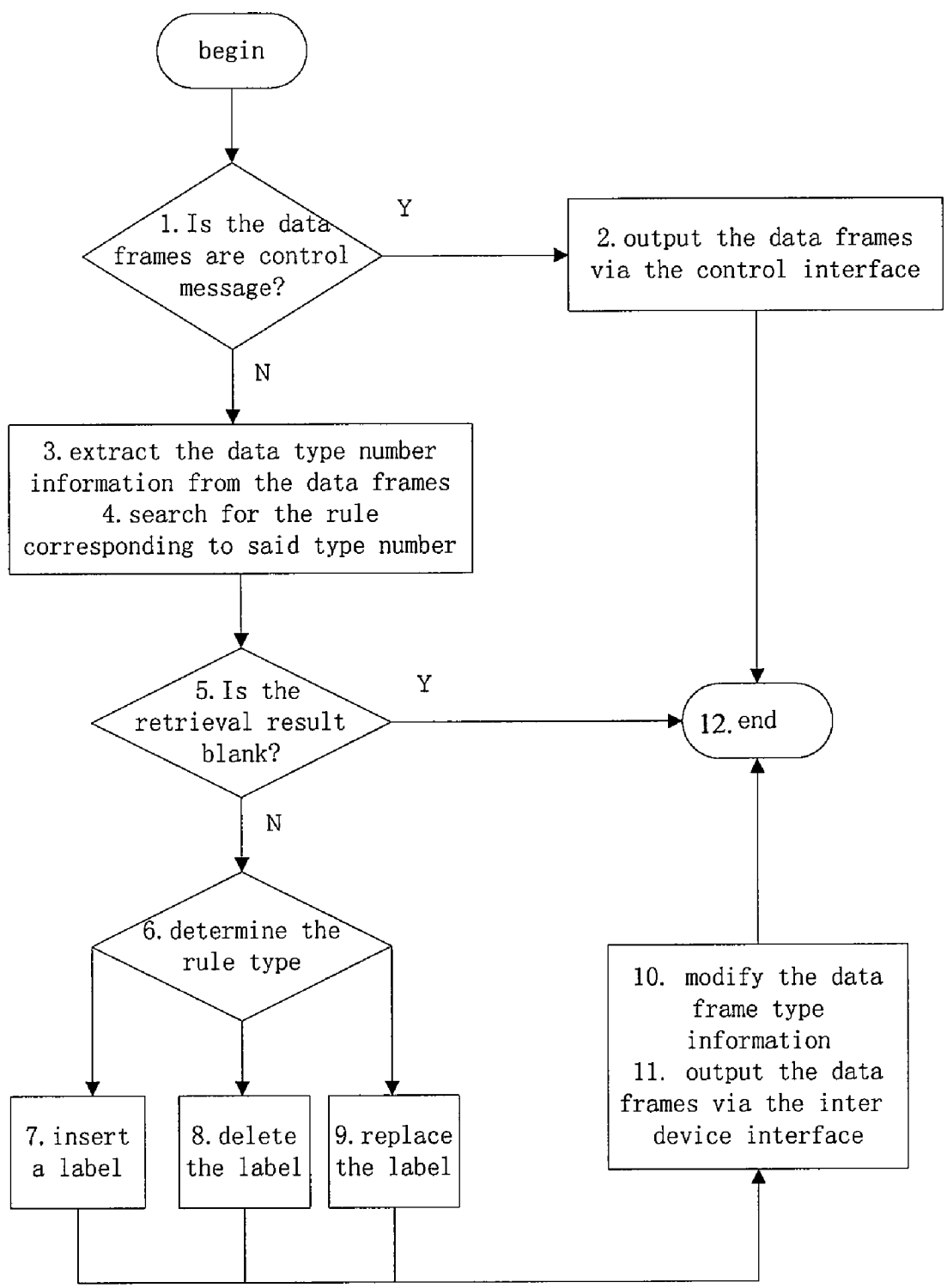
FIG. 5 shows the schematic block diagram of the virtual private device in a preferred embodiment of the system accessing and transmitting Ethernet data frames in a SDH/SONET network according to the present invention.
Figure 6:
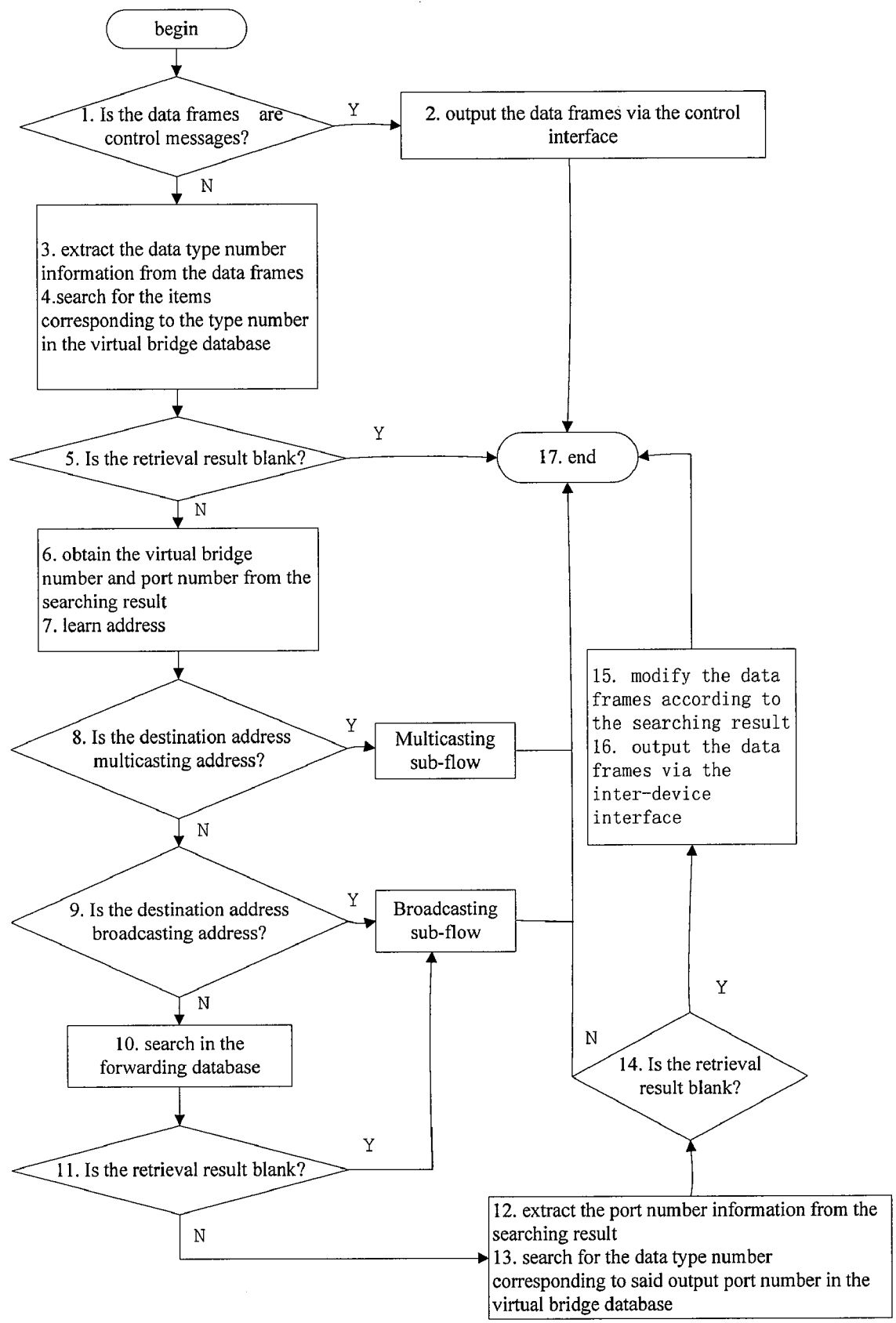
FIG. 6 shows the schematic block diagram of the virtual bridge device in a preferred embodiment of the system accessing and transmitting Ethernet data frames in a SDH/SONET network according to the present invention.
Figure 7F:
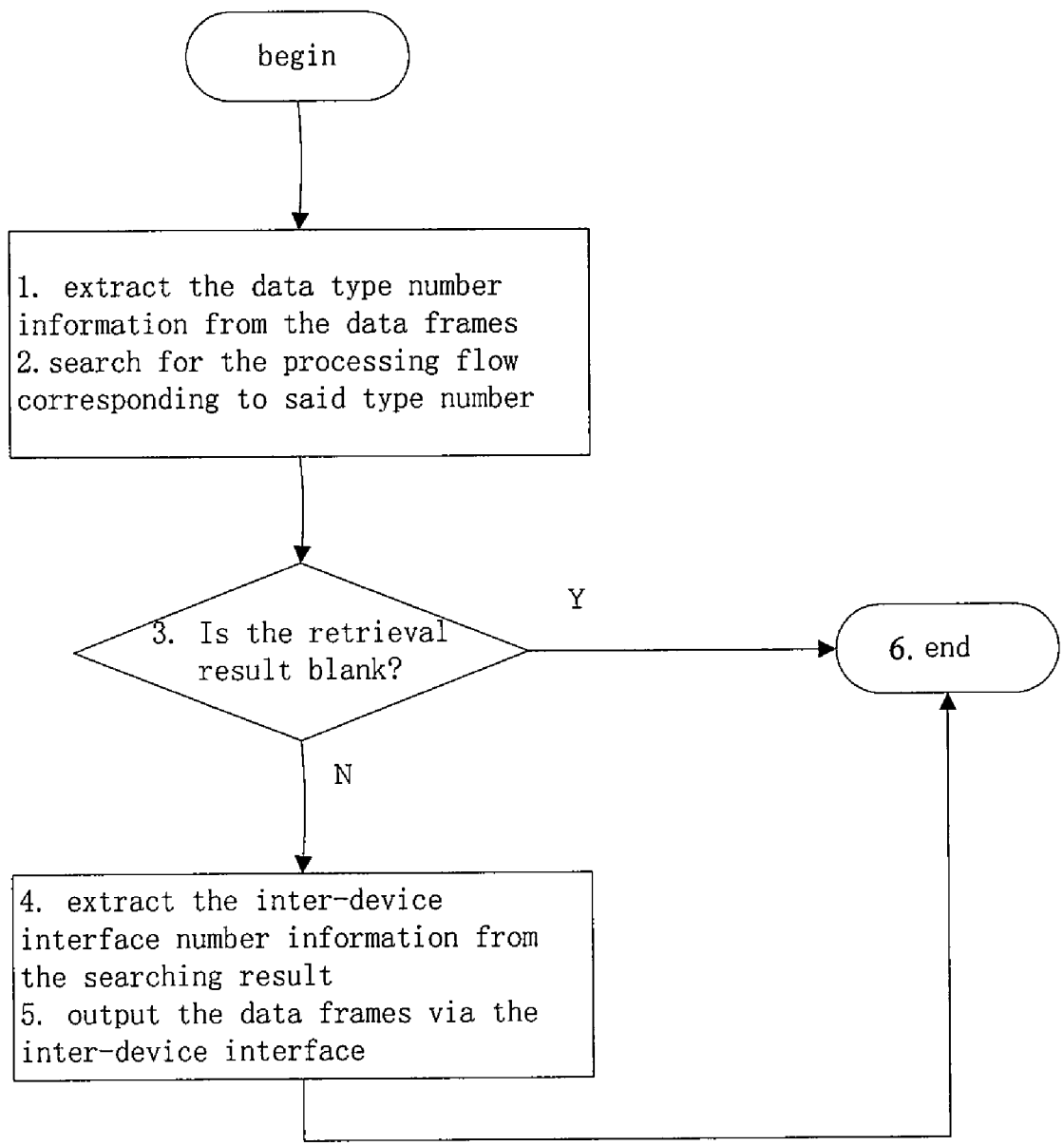
FIG. 7 shows the schematic block diagram of the data processing and dispatching device in a preferred embodiment of the system accessing and transmitting Ethernet data frames in a SDH/SONET network according to the present invention.

FIG. 6 shows the schematic block diagram of a virtual bridge device in a preferred embodiment of the system accessing and transmitting Ethernet data frames in a SDH/SONET network according to the present invention. The present invention overcomes the issue of limited Ethernet data frame address space through a virtual bridge device. A virtual bridge device may provide a plurality of virtual bridges. Each virtual bridge possesses all features and properties of the bridge device. However, it is different to the bridge device that the virtual bridge may be set up and deleted dynamically. During operation of the system, the operator may set up or delete a plurality of virtual bridges dynamically because each virtual bridge has an independent address space, the operator may provide VLAN services to users with different virtual bridges if that conflicts exists among address spaces.

The operator may configure a virtual bridge just like a physical bridge. The virtual bridge further expands the features of physical bridge to support VMAN-based switching operation. A virtual bridge device comprises a virtual bridge processing unit 802, a multicasting database 856, a control interface unit, a forwarding database 852, and a virtual bridge database 854. The virtual bridge processing unit has 3 major functions:
 (a) Detecting control messages and transferring the control messages to the control system of the device via the control interface unit.
 (b) Learning addresses, and storing the knowledge acquired into the forwarding database;
 (c) Performing switching for data frames except for control messages and modifying data type information in the data frames.

The virtual bridge processing unit is the processing center of the device, and there are five items embedded in it:
 (a) Format of control messages;
 (b) Processing steps and logic for data frames;
 (c) Format of forwarding items in the forwarding database;
 (d) Format of multicasting items in the multicasting database;
 (e) Format of items in the virtual bridge database The virtual bridge database, multicasting database, and forwarding database control the processing behaviors of the virtual bridge processing unit, and the items in them may be updated during operation of the system. The data formats of items in the multicasting database items and forwarding database are identical, and each item contains the following information:
 (a) virtual bridge number;
 (b) Input port of virtual bridge;
 (c) Destination address input;
 (d) VLAN serial number input;
 (e) VMAN serial number input;
 (f) Output port of virtual bridge;

In the multicasting database, the database code is the combination of all fields; in the forwarding database, the database code is the combination of all fields except for output port of virtual bridge.

Each item in the virtual bridge database contains the following information:
 (a) Type number input;
 (b) virtual bridge number;
 (c) Port number;
 (d) Type number output;

Via the control interface, an external control system may implement the following functions:
 (a) Performing adding, deleting, editing, and querying operations to items in the database;
 (b) Monitoring the working state of the virtual bridge processing unit.

The virtual bridge device is connected to the data processing and dispatching device via the inter-device interface. The virtual bridge device is connected to the control system of the device via the control interface.

FIG. 6 (F1) shows the flowchart of the virtual bridge device processing the data entering the inter-device interface in a preferred embodiment of the system accessing and transmitting Ethernet data frames in a SDH/SONET network according to the present invention. For data frames entering the device via the inter-device interface, the virtual bridge processing unit performs the following processing steps:

Step 1: determining whether the data frames are control messages; if yes, going to step 3;

Step 2: transferring the data frames to an external control system via the control interface unit, and then going to step 17;

Step 3: extracting input data type number, destination address, source address, VLAN number, and VMAN number (optional) from a fixed position in the data frames;

Step 4: searching in the virtual bridge database with the index of the data type number extracted;

Step 5: determining the retrieval result; if it is blank, discarding said data frames and going to step 17;

Step 6: obtaining the virtual bridge number and port number information from the retrieval result;

Step 7: learning the source address, and then updating the forwarding database according to the learning result;

Step 8: determining whether the destination address is a multicasting address; if yes, executing a multicasting subflow, and then going to step 17;

Step 9: determining whether the destination address is a broadcast address, if yes, executes a broadcasting sub-flow, and then going to step 17;

Step 10: searching in the forwarding database with the index of virtual bridge number, input port, and destination address, VLAN number, and VMAN number (optional);

Step 11: determining the retrieval result; if it is blank, executing a broadcasting sub-flow, and then going to step 17;

Step 12: extracting output port number from the retrieval result;

Step 13: searching in the virtual bridge database with the index of the virtual bridge number and the output port number;

Step 14: determining the retrieval result; if it is blank, discarding said data frames and going to step 17;

Step 15: extracting output type number from the retrieval result and modifying the data frame, i.e., replacing the type number in the data frames with the output data type number;

Step 16: outputting the modified data frames via the inter-device interface;

Step 17: ending.

FIG. 7 (F) shows the flowchart of the data processing and dispatching device processing the data entering the device in a preferred embodiment of the system accessing and transmitting Ethernet data frames in a SDH/SONET network according to the present invention. The processing steps are as follows:

Step 1: extracting the type number from the data frames;

Step 2: searching in the processing flow database with the index of the extracted type number;

Step 3: determining the retrieval result; if it is blank, discarding said data frames and going to step 6;

Step 4: extracting inter-device interface number from the retrieval result;

Step 5: outputting the data frames via the inter-device interface corresponding to the inter-device interface number;

Step 6: ending.

Application of the system:

The operator may utilize the system shown in FIG. 4 to provide users Ethernet services, which correspond to combinations of processing flows. The operator may define and choose required processing flow combinations flexibly according to network topology, the users' service demands and bandwidth resource. Processing flow combinations common used are as follows:

Processing flow combination 1:
(1)The virtual interface device classifies the data frames;
(2)The virtual interface device outputs the data frames to corresponding device interfaces.

Processing flow combination 2:
(1) The virtual interface device classifies the data frames;
(2) The virtual bridge Device switches the data frames;
(3) The virtual interface device outputs the data frames to corresponding device interfaces.

Processing flow combination 3:
(1) The virtual interface device classifies the data frames;
(2) The virtual private device processes the data frames (relay, converge, or deconverge);
(3) The virtual interface device outputs the data frames to corresponding device interfaces.

Processing flow combination 4:
(1) The virtual interface device classifies the data frames;
(2) The RPR device processes the data frames (terminates, relays, or starts data frame transmission);
(3) The virtual interface device outputs the data frames to corresponding device interfaces.

When implementing functions of the system, the device manufacturers may partially or completely employ above method. For devices with simple functions, partial components can be omitted and the processing is relatively simple. The device manufacturers may even treat the processing as firmware through fixing connections among the devices to omit the data processing and dispatching device. For instance, for a device that only provides Ethernet private service, it may only comprises the following devices:
(1) One or more UNIs;
(2) One or more NNIs and mapping/demapping devices;
(3) A virtual interface device;
(4) A virtual private device.

Said device supports the following processing flow combinations:
(1) Processing flow combination 1;
(2) Processing flow combination 3.

With the system and method of the present invention, integral VLAN services can be provided for users. The system and method in the present invention overcome the restriction on Ethernet data frame address space at UNIs. When a plurality of Ethernet data frames is sent to such a network device, there is no restriction on address space of Ethernet data frames.

With the system and method of the present invention, a device interface (UNI or NNI) supports both VLAN service and Ethernet private service, and a plurality of Ethernet data frames from many users can be accessed and converged at a single device interface, thus the accessing and converging capability of the device is enhanced greatly.

With the system and method of the present invention, the operator may maximize processing capacity of its equipments and utilization ratio of bandwidth resource through flexible adjustment to internal processing flows according to network topology, the users' service demands, and bandwidth resource.

With the system and method of the present invention, individualized services can be quickly provided for users. The operator may provide new services to users through creating new flow combinations, without upgrading or adding new equipment.

According to the present invention, data frames entering the device via device interfaces are processed after classified; different data types correspond to different processing flows, which are implemented by virtual interface devices.

Existing technical schemes and devices have to be implemented on a presumption: data frames from a device interface belong to the same type, and different types of data frames enter the device via different device interfaces. Therefore, in the prior technical scheme and system, data frames entering the device via the same device interface are processed through the same processing flow, thus the mapping relationship between processing flows and device interfaces is 1:n. As a result, if there are many data types sometimes, though the processing capacity of the device is still sufficient enough, some services can't be supported due to lack of free device interfaces.

Whereas with the system and method of the present invention, data frames from a device interface may contain various types, and processing flows for different types of data frames are different; the mapping relationship between processing flows and device interfaces is m:n.

In addition, the present invention supports free combination of processing flows; the combination of data processing and dispatching device and its processing flows is an important part of the present invention.

Existing technical schemes and devices have no data processing and dispatching device and only support several fixed processing flows. As the result, they are lack of flexibility and resiliency. However, the requirements of operators for equipment are changing actually.

A system lacking of flexibility and resiliency is unable to adapt to changing environment. With the present invention, the operator can update the processing flows dynamically, and users can choose appropriate flow combinations or create new flow combinations as required. There are 22 or more processing flow combinations available.

In existing technical schemes and devices, the amount of bridge devices is certain; so conflicts among data frame address spaces of different users can be avoided only through restricting the data frame address spaces of users. Whereas the virtual bridge devices in the present invention support dynamical expansion (i.e., add new virtual bridges), and the address space of each virtual bridge is independent; different virtual bridges correspond to different users; hence the present invention has no restriction to data frame address spaces of users.

In addition, Data frames of different users can be isolated, transmitted and shared by adding a label before sending, changing the label during transmission and removing the label at destination address, thus the virtual private device of the present invention is achieved.

Though the present invention is described with reference to above embodiments, it is understood that any skilled in this field can easily make any change and modification without escaping the spirit of the present invention. So any change and modification should be in the scope of the present invention.

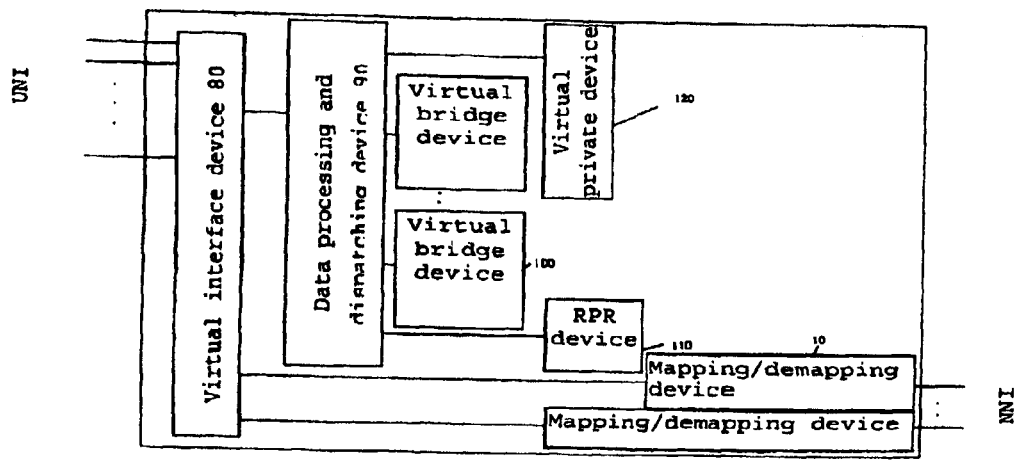

The invention claimed is:

1. A system for accessing and transmitting different data frames in a digital transmission network, comprising:
   at least a user-network interface (UNI) from plurality of UNIs, which is used to couple with a user's network; and/or at least a network-network interface (NNI) from plurality of NNIs, which is used to couple with said digital transmission network to transfer data; and
   a data converting device, which is coupled with said UNIs and said NNIs to convert data formats between said UNIs, data formats between said NNIs, or data formats between said NNIs and said UNIs;
   said data converting device comprises a virtual interface device, said virtual interface device comprises: at least two device interfaces which comprises UNIs or NNIs, for inputting or outputting data frames; a virtual interface processing unit, which couples with said device interfaces to process said data frames and exchange said data frames between said virtual interface processing unit and corresponding device interfaces; a rule database, which couples with said virtual interface processing unit and stores rules corresponding to different data frames, said virtual interface processing unit determines a processing flow according to the classification of data frames under said rules; a control interface unit, which couples with said rule database and said virtual interface processing unit to control said rule database and said virtual interface processing unit; an inter-device interface, which couples with said virtual interface processing unit to couple with external devices to exchange data,
   wherein a corresponding relationship between said device interfaces and said rules is 1:N, N being a natural number greater than 1, and each device interface is configured as a device interface meeting a requirement of the data interface corresponding to any of the rules.

2. A system for accessing and transmitting different data frames in a digital transmission network according to claim 1, wherein said control interface unit provides an external control interface, through which an operation of the virtual processing unit is inspected, and addition, deletion, modification and searching operations are performed to rules in said rule database.

3. A system for accessing and transmitting different data frames in a digital transmission network according to claim 2, wherein the rule comprises device interface number, data frame type number, data frame address offset, data frame type value, and data frame comparison mask, which provides relevant processing and control parameters when said virtual interface processing unit processes said data frames.

4. A system for accessing and transmitting different data frames in a digital transmission network according to claim 1, wherein said device interfaces connect with said UNIs or said NNIs, a corresponding relation between said device interfaces and said UNIs or said NNIs is 1:1.

5. A method of accessing and transmitting different data frames in a digital transmission network through the system of claim 1, comprising the following steps:
   Searching for a rule corresponding to said device interface;
   Determining whether said rule is found;
   If yes, obtaining type information of the data frames;
   determining whether said type information complies with a second rule in the rules;
   If not, searching for the next rule corresponding to the device interface, and determining again whether said rule is found; and
   If yes, modifying said data frames information, outputting the data frames via the inter-device interface.

6. A method of accessing and transmitting data frames in a digital transmission network according to claim 5, wherein when the data frame enters the device via the inter-device interface, said virtual interface device also performs the following steps:
   Extracting the type information of the data frames, and searching for corresponding rule in the rule database according to said type information;
   If the rule is not found, discarding said data frames;
   If the rule is found, modifying said data frames information, and sending the data frames to a corresponding device interface according to the rule.

7. A method of accessing and transmitting data frames in a digital transmission network according to claim 5, wherein the rule database is searched according to the number of a device interface receiving the data frames.

8. A method of accessing and transmitting data frames in a digital transmission network according to claim 5, wherein said step of the rule being not found comprises the step of outputting a report and discarding said data frames.

9. A method of accessing and transmitting data frames in a digital transmission network according to claim 5, wherein the step of obtaining the type information of the data frames comprises: read information at an address offset according to the address offset of the data frames, and perform "AND" operation between said read information and a data frame comparison mask in the rule.

10. A method of accessing and transmitting data frames in a digital transmission network according to claim 9, wherein the step of determining whether the type information complies with the second rule in the rules comprises the following step: comparing the type information with the data frame type value in the rules.

11. A method of accessing and transmitting data frames in a digital transmission network according to claim 9, wherein the step of modifying the data frames information comprises the following step: inserting data type number information at a head position of the data frames.

12. A method of accessing and transmitting data frames in a digital transmission network according to claim 6, wherein the step of extracting the type information of the data frames comprises the following step: extracting data type number information at a head position of the data frames.

13. A method of accessing and transmitting data frames in a digital transmission network according to claim 12, wherein the step of searching corresponding rule in the rule database comprises the following step: searching in the rule database with an index of the data frame type number.

14. A method of accessing and transmitting data frames in a digital transmission network according to claim 13, wherein the step of modifying the data frame information and sending the data frames to corresponding device interfaces according to corresponding rules comprises the following steps: deleting the data type number information at the head position; and sending the data frames to corresponding device interfaces according to the device interface number in the rule.

* * * * *

UNITED STATES PATENT AND TRADEMARK OFFICE
CERTIFICATE OF CORRECTION

| | |
|---|---|
| PATENT NO. | : 7,505,481 B2 |
| APPLICATION NO. | : 10/765204 |
| DATED | : March 17, 2009 |
| INVENTOR(S) | : Zhiqun He Shenzhen et al. |

It is certified that error appears in the above-identified patent and that said Letters Patent is hereby corrected as shown below:

The title page showing an illustrated figure, should be deleted and substitute therefor the attached title page.

On the title page, drawing sheets should be changed to 11 drawings.

The drawing sheets consisting of figures 4, 4A, 5, 6 and 7 should be deleted to appear as per attached figures 4, 4A, 5, 6 and 7.

Signed and Sealed this

Seventeenth Day of August, 2010

David J. Kappos
*Director of the United States Patent and Trademark Office*

United States Patent
He et al.

(10) Patent No.: US 7,505,481 B2
(45) Date of Patent: Mar. 17, 2009

(54) SYSTEM AND METHOD OF ACCESSING AND TRANSMITTING DIFFERENT DATA FRAMES IN A DIGITAL TRANSMISSION NETWORK

(75) Inventors: Zhiqun He, Shenzhen (CN); Yuxiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1057 days.

(21) Appl. No.: 10/765,204

(22) Filed: Jan. 28, 2004

(65) Prior Publication Data
US 2005/0008029 A1 Jan. 13, 2005

(30) Foreign Application Priority Data
Jan. 28, 2003 (CN) ............................. 03 1 03094

(51) Int. Cl.
*H04J 3/22* (2006.01)
(52) U.S. Cl. .................. 370/466; 370/395.52; 370/392; 370/474
(58) Field of Classification Search .......... 370/465, 370/466, 401, 402, 473, 389, 404, 395.52, 370/395.51, 392, 474; 709/220, 238, 224–230, 709/249; 713/153, 154; 726/12–15
See application file for complete search history.

(56) References Cited

U.S. PATENT DOCUMENTS

| 5,541,853 | A | 7/1996 | Croft |
| 6,122,281 | A | 9/2000 | Donovan et al. |
| 2004/0076166 | A1 * | 4/2004 | Patenaude ............... 370/401 |
| 2004/0258080 | A1 * | 12/2004 | He et al. ............... 370/401 |
| 2005/0008029 | A1 * | 1/2005 | He et al. ............... 709/249 |

FOREIGN PATENT DOCUMENTS

CN 1299546 A 6/2001

OTHER PUBLICATIONS

"Multiple Services Ring Based on RPR"; Telecommunication Standardization Sector, Study Group 17, TD 2132 Rev. 3; Study Period 2001-2004; Geneva 2002; International Telecommunication Union.

(Continued)

*Primary Examiner*—Ian N Moore
(74) *Attorney, Agent, or Firm*—McDermott Will & Emery LLP

(57) ABSTRACT

A system accessing and transmitting different data frames in a digital transmission network for accessing and transmitting different data frames, including: at least a user-network interface (UNI), which is used to couple with the user's network; at least a network-network interface (NNI), which is used to couple with the digital transmission network to transfer data; a data converting device, which is coupled with the UNIs and the NNIs to convert data formats between the UNIs, data formats between the NNIs, or data formats between the NNIs and the UNIs; wherein the data converting device includes a virtual interface device, the virtual interface device includes: at least two device interfaces, a virtual interface processing unit, a rule database, a control interface unit and an inter-device interface, so as to improve access ability of the device.

14 Claims, 11 Drawing Sheets